United States Patent [19]

Takahashi et al.

[11] Patent Number: 5,287,355
[45] Date of Patent: Feb. 15, 1994

[54] MODULE COMPRISING IN AN ATM EXCHANGE CONNECTION PORTS, EACH TRANSMITTING A CELL INDICATIVE OF A DESTINATION MODULE IN A CELL HEADER

[75] Inventors: Kiyoh Takahashi; Hiroshi Shimizu; Yoshihiko Itou; Osamu Yamato, all of Tokyo, Japan

[73] Assignee: NEC Corporation, Tokyo, Japan

[21] Appl. No.: 910,587

[22] Filed: Jul. 8, 1992

[30] Foreign Application Priority Data

Jul. 8, 1991 [JP] Japan .................. 3-166074
Dec. 26, 1991 [JP] Japan .................. 3-345661

[51] Int. Cl.⁵ .................................. H04L 12/40
[52] U.S. Cl. ......................... 370/85.13; 370/94.1
[58] Field of Search .............. 370/58.3, 60, 85.7, 370/85.9, 85.13, 94.1, 99

[56] References Cited

U.S. PATENT DOCUMENTS

4,707,827 11/1987 Bione et al. .................. 370/85.13
4,933,937 6/1990 Konishi ......................... 370/85.13
5,163,048 11/1992 Heutink ........................ 370/94.1

Primary Examiner—Benedict V. Safourek
Attorney, Agent, or Firm—Sughrue, Mion, Zinn, Macpeak & Seas

[57] ABSTRACT

In a local module (11(1)) of an asynchronous time division exchange or switching system, each of connection ports (17) transfers a transmission signal to a module bus (19) as a cell with its header made to indicate a destination module number and a destination port number as a VCI (Virtual channel identifier) when the signal is directed to a destination module (11(N)) and one of the connection ports, respectively. Preferably, a connection control unit (15) of the local module transfers and does not transfer the cell to a highway bus (13) when the signal is directed to the destination module and the last-mentioned one of the connection ports. More preferably, the header additionally indicates a binary one and zero bit when the signal is directed to the destination module and the last-mentioned one of the connection ports.

22 Claims, 3 Drawing Sheets

| (1) | AH | VPI | VCI | DT |

| | AH | MLN | HLCN | DT |
|---|---|---|---|---|
| (2) | | | | |

| | AH | PTN | MLCN | DT |
|---|---|---|---|---|
| (3) | | | | |

| | MLN | HLCN | DT |
|---|---|---|---|
| (4) | | | |

MODULE COMPRISING IN AN ATM EXCHANGE CONNECTION PORTS, EACH TRANSMITTING A CELL INDICATIVE OF A DESTINATION MODULE IN A CELL HEADER

BACKGROUND OF THE INVENTION

This invention relates to an asynchronous transfer mode (ATM) exchange or switching system and, more particularly, to the individual modules used in the ATM exchange system. The ATM exchange system is also referred to as an asynchronous time division exchange system.

In connection with an asynchronous time division exchange system, one of the modules will be taken into consideration and will herein be called a local module. In the manner which will later be described more in detail, the local module is connected through a highway bus to other modules of the asynchronous time division exchange system. In the manner known in the art, the asynchronous time division exchange system switches transmission data among the local and the other modules in accordance with an ATM mode.

Each of the local and the other modules comprises a connection control unit connected to the highway bus and a plurality of connection ports connected to the connection control unit through a module bus. Each of the connection ports is for dealing with a transmission signal. The transmission data comprise such transmission signals and control data for use in controlling switching of the transmission data.

In a conventional asynchronous time division exchange system, the transmission data are usually transmitted as data packets. More particularly, each connection port processes each transmission signal into a data packet including, besides a logic channel group number (LCGN), a logic channel number (LCN) which serves as a virtual channel identifier (VCI) standardized by the CCITT and by a broad-band ISDN recommendation series. The logic channel number therefore indicates, as a destination module, one of the local and the other modules that should receive the transmission signal.

For convenience of the description which follows, each of the local and the other modules will be called a particular module. The connection control unit of the particular module checks the logic channel number which is included in the data packet received through the highway bus. When the particular module is the destination module, the connection control unit transfers the data packet to the module bus of the destination module. Otherwise, the data packet is a spurious or unnecessary packet insofar as the particular module is concerned. Such spurious packets are transmitted through the highway bus.

Inasmuch as the connection control unit must check not only the data packet directed to the particular module but also the unnecessary packets, operation of the conventional asynchronous time division exchange system is troublesome. It takes a long time for the connection control unit to discriminate between the data packet directed to the particular module and the spurious packets. This results in a defect of adversely affecting performance of the exchange system.

A great number, such as scores of thousands, of the logic channel numbers are often used. In such an event, the above-mentioned defect gives rise to a serious disadvantage in that a large-scaled connection control unit becomes indispensable.

SUMMARY OF THE INVENTION

It is consequently an object of the present invention to provide a module for use in an asynchronous time division exchange system, which module makes the exchange system efficiently switch transmission data within the module and towards and from other modules used in the exchange system.

It is another object of this invention to provide a module of the type described and which comprises a compact connection control unit even when a great number of logic channel numbers are used.

Other objects of this invention will become clear as the description proceeds.

On setting forth an aspect of this invention, a local module is connected to other modules through a highway bus in an asynchronous time division exchange system for switching transmission data among the local and the other modules. In the exchange system under consideration, each of the local and the other modules comprises a connection control unit connected to the highway bus, a plurality of connection ports, and a module bus connecting the connection ports to the connection control unit. Each of the connection ports is for dealing with a transmission signal.

In accordance with the above-mentioned aspect of this invention, each of the connection ports of the above-understood module is for transferring the transmission signal to the module bus as a cell with its header made to indicate a destination module number and a destination port number as a virtual path identifier when the transmission signal is directed to one of the other modules and to one of the connection ports of the local module, respectively.

On setting forth a different aspect of this invention, it is possible to understand that a plurality of modules are connected through a highway bus in an asynchronous time division exchange system for switching transmission data among the modules. Each of the modules under consideration comprises a connection control unit, a plurality of connection ports, and a module bus connecting the connection ports to the connection control unit. Each of the connection ports in question is for dealing with a transmission signal. Attention will be directed to one of the above-understood modules as a destination module to which the transmission signal is directed.

In accordance with another aspect of this invention, a particular module of the above-described modules is an originating module. Each of the connection ports of the originating module transfers the transmission signal to the module bus of the particular module as a cell with its header made to indicate a destination module number and a destination port number as a virtual path identifier when the destination module is different from and identical with the particular module, respectively.

On setting forth the a further aspect of this invention, an asynchronous time division exchange system comprises a plurality of modules and a highway bus connecting the modules and is for switching transmission data among the modules. In the asynchronous time division exchange system under consideration, each module comprises a connection control unit connected to the highway bus, a plurality of connection ports, and a module bus connecting the connection ports to the connection control unit, among which each connection port is for dealing with a transmission signal.

In accordance with this latter aspect of this invention, each of the connection ports in one of the modules of the above described asynchronous exchange system is for transferring the transmission signal to the module bus of this one of the modules as a cell with its header made to indicate a destination module number and a destination port number as a virtual path identifier when the transmission signal is directed to a different one of the modules and to one of the connection ports of the above-mentioned one of the modules.

DESCRIPTION OF THE PREFERRED EMBODIMENT

Figure 1:
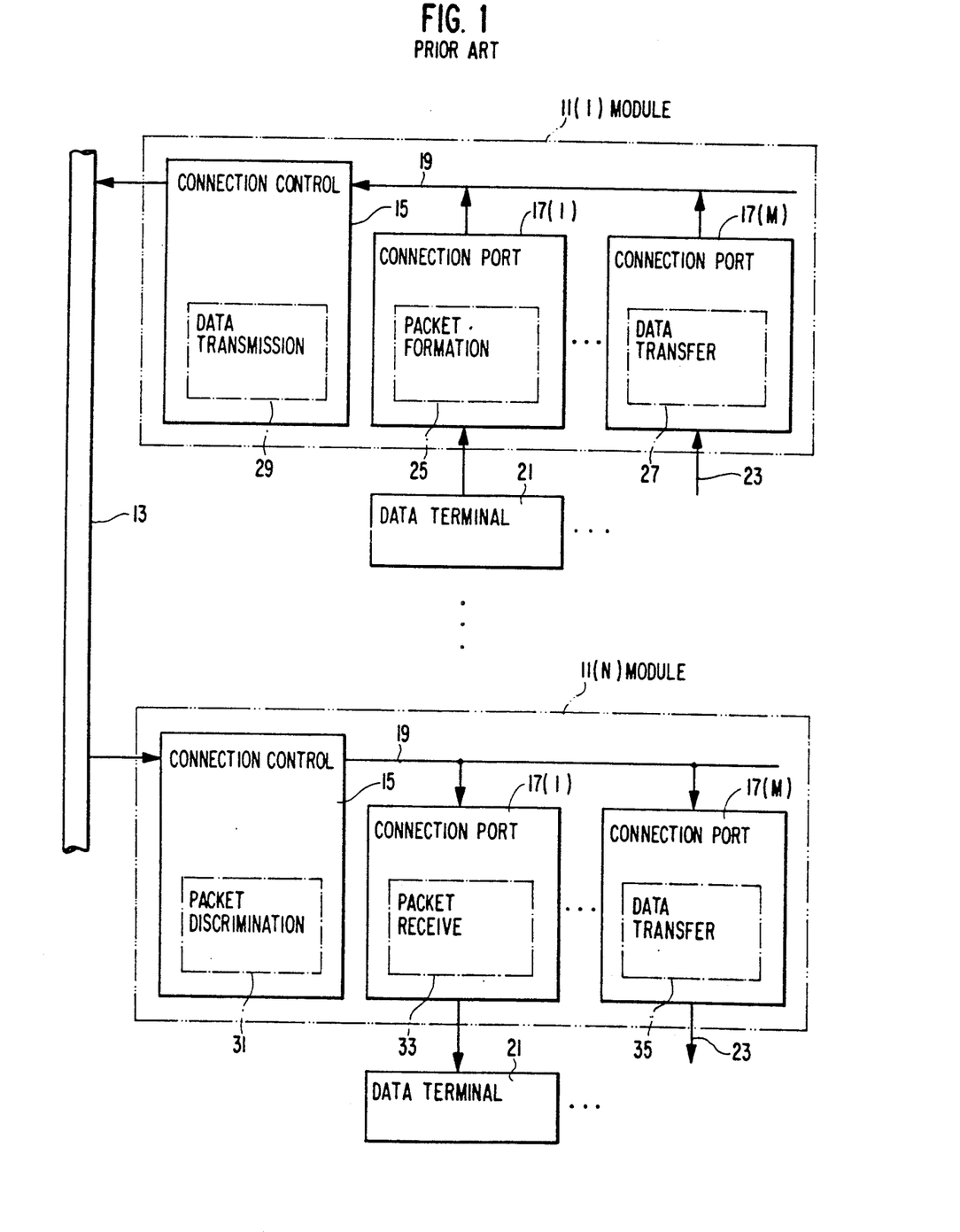
FIG. 1 is a block diagram of a conventional asynchronous time division exchange system.

Referring to FIG. 1, a conventional asynchronous time division exchange or switching system will first be described in order to facilitate an understanding of the present invention. Such an asynchronous time division exchange system is operable according to an asynchronous transfer mode (ATM).

In general, an asynchronous time division exchange system comprises first through N-th modules 11(1), . . . , and 11(N) which are connected together through a highway bus 13, where N represents a first integer which is typically equal to forty and may be greater than forty. The highway bus 13 is operable at a high bit rate of 128 Mbits per second, 600 Mbits per second, or higher. Each of the modules 11 (suffixes omitted) serves as a transmission or sender and a reception or receiver module for transmitting and receiving transmission data to and from the highway bus 13. Each module is alternatively called an n-th module 11(n), where n is variable between 1 and the first integer, both inclusive.

Merely for simplicity of illustration, the first module 11(1) is depicted as the transmission module and the N-th module 11(N), as the reception module. One of the first through the N-th modules 11 will be taken into consideration as a local module 11(L). Other modules will be designated by 11(O). It is possible to understand without loss of generality that the first module 11(1) is the local module 11(L).

The n-th module 11(n) comprises an interbus connection control unit 15 connected to the highway bus 13 and controls transmission and reception of the transmission data in the manner which will presently be described. First through M-th connection ports 17(1), . . . , and 17(M) are connected to the connection control unit 15 through a module bus 19, where M represents a second integer which may vary, for example, between sixteen and one hundred. Each of the connection ports 17 is connected either to a data terminal 21 or to a tandem line 23 which is connected in turn to at least one external module (not shown) in the manner known in the art.

Each connection port 17 is called a terminal connection port 17(T) and a line connection port 17(L) if connected to the data terminal 21 and to the tandem line 23. In the example being illustrated, the first through the M'-th connection ports 17 are the terminal connection ports 17(T) and the (M'+1)-th through the M-th connection ports 17 are the line connection ports 17(L), where M' represents a third integer which is less than the second integer M and may be nearly equal to the second integer. The first through the M'-th connection ports 17 are consequently connected to first through M'-th data terminals, which will collectively be designated by the reference numeral 21.

Each of the data terminals 21 and the external modules is for transmitting and receiving a transmission signal through the asynchronous exchange system. Details will be described in the following as it regards the data terminals 21 connected to the first and the N-th modules 11(1) and 11(N) which are the transmission and the reception modules and, from a different point of view, are the local module 11(L) and one of the other modules 11(O).

· Each of the terminal connection ports 17(T) will be called an m-th connection port 17(m), where m is variable between 1 and the third integer M', both inclusive. Among the first through the M'-th data terminals 21, an m-th data terminal 21(m) is connected to the m-th terminal connection port 17(m).

In the first module 11(1) of the conventional asynchronous time division exchange system, the m-th connection port 17(m) receives the transmission signal from the m-th data terminal 21(m) and forms a data packet by a packet formation arrangement 25. In the data packet, its data field DT (later illustrated) represents information carried by the transmission signal. Besides the data field, the data packet comprises an octet field representative of a logic channel number (LCN) as a virtual channel identifier (VCI) which is standardized by the CCITT Recommendation I.361 and by broad-band ISDN recommendation series. Each of the line connection ports 17(L) is similarly operable by a data transfer arrangement 27.

Such data packets are sent to the module bus 19 from the terminal and the line connection ports 21 as transmission data under control by a module bus adjuster which has no direct connection with this invention and is therefore not illustrated. In the first module 11(1) under consideration, the connection control unit 15 judges, from the logic channel number in each transmission datum or data packet, one of the other modules 11(O) that should receive as a destination module the transmission datum in question. Depending on the circumstances, the transmission datum is directed or destined from the m-th connection port 17(m) of the n-th module 11(n) to another of the terminal and the line connection ports 17 in the n-th module 11(n).

If the transmission datum is directed to the destination module, the connection control unit 15 sends the transmission datum to the highway bus 13 by a data transmission arrangement 29. In this manner, the highway bus 13 transmits the transmission data among the local and the other modules 11.

In the N-th module 11(N) of the conventional asynchronous exchange system, the connection control unit 15 receives the transmission data or data packets transmitted through the highway bus 13 and comprises a packet discrimination arrangement 31 for discriminating between the logic channel numbers. The received transmission data includes the logic channel number indicative of the N-th module 11(N) as the destination module. Other transmission data are spurious or unnecessary data which are received by the control connection unit 15 of the N-th module 11(N) and are not actually directed to the N-th module 11(N). In the N-th module 11(N), the connection control unit 15 sends the arriving data to the module bus 19 and discards the spurious data.

Together with the destination module, the logic channel number specifies one of the terminal and the line connection ports 17 of the destination module that should serve as a destination port for receiving the transmission signal. In other words, the logic channel number specifies ordinal numbers, such as representative of n and m, collectively as a destination address.

In the destination module, each of the terminal connection ports 17(T) comprises a packet receive arrangement 33 for selecting by the logic channel number those of the arriving data which are directed to the terminal connection port under consideration as selected data. By the packet receive arrangement 33, the m-th connection port 17(m) selects the selected data to supply the m-th data terminal 21(m) with the transmission signals included in the selected data and to leave others of the arriving data transmitted through the module bus 19. Each of the line connection ports 17(L) comprises a data transfer arrangement 35 which is similar to the data transfer arrangement 27 described above and selects the arriving data directed thereto to supply the tandem line 23 connected thereto with the transmission signals included in the last-mentioned arriving data.

In addition to the destination address mentioned in the foregoing, the logic channel number specifies an originating address which represents the ordinal number indicative of m and n. Furthermore, the logic channel number is decided in consideration of multiplexed paths. As a consequence, a great number of the logic channel numbers are often used in the transmission data or data packets transmitted through the highway bus 13. Each connection control unit 15 must once receive the transmission data transmitted through the highway bus 13, discriminate between the arriving and the spurious data, and discard the spurious data.

In the manner described heretobefore, this is troublesome and adversely affects performance of the asynchronous time division exchange system. In addition, the connection control unit 15 of each module 11 must be a large-scaled one in order to deal with this great number of logic channel numbers.

Figure 2:
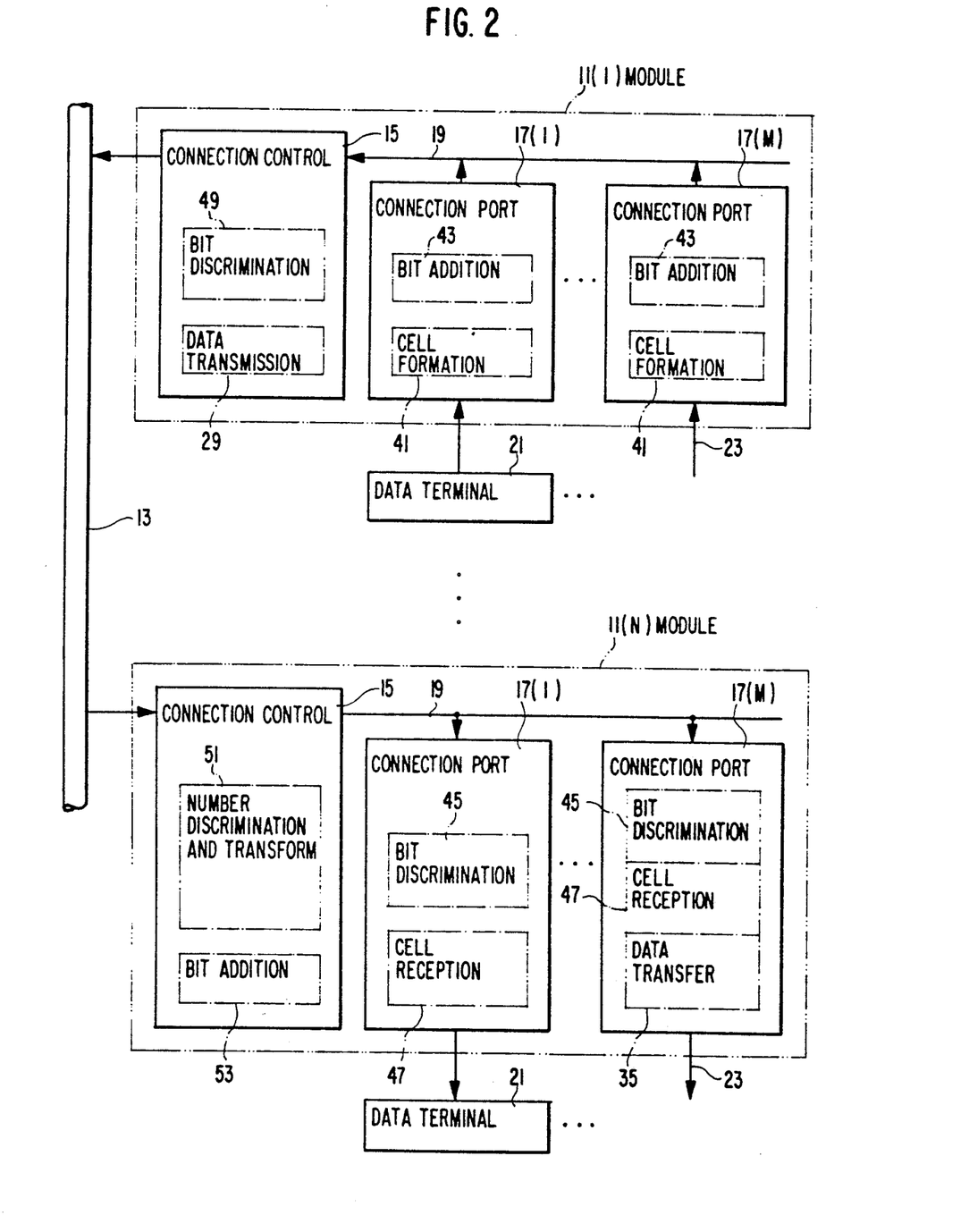
FIG. 2 is a block diagram illustrative of, together with data terminals and tandem lines, an asynchronous time division exchange system which comprises modules according to an embodiment of the instant invention.
Figure 3:
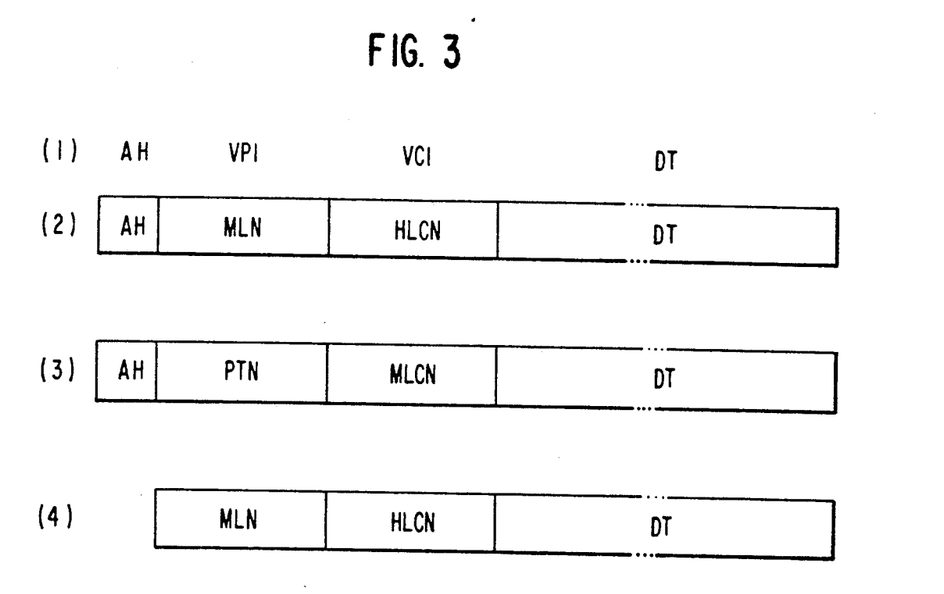
FIG. 3 schematically shows formats of a cell which is used in the asynchronous time division exchange system depicted in FIG. 2.

Referring now to FIGS. 2 and 3, the description will proceed to an asynchronous time division exchange or switching system according to a preferred embodiment of this invention. In FIG. 2, the exchange system comprises similar parts which are designated by like reference numerals and similarly operable with likewise named signals unless otherwise specified in the following.

It should first be pointed out that each of the connection ports 17 of the transmission module, such as the first or the local module 11(1), comprises a cell formation arrangement 41 and an additional bit addition arrangement 43. Each of the connection ports 17 of the reception module, such as the N-th module 11(N), comprises an additional bit discrimination arrangement 45 and a cell reception arrangement 47.

In each terminal connection port 17(T), a first combination of the cell formation and the bit addition arrangements 41 and 43 and a second combination of the bit discrimination and the cell reception arrangements 45 and 47 are used instead of the packet formation and reception arrangements 25 and 33 described in conjunction with FIG. 1, respectively. In each line connection port 17(L) of the transmission module, the first combination is used in place of the data transfer arrangement 27 described in connection with FIG. 1. Each line connection port 17(L) of the reception module comprises the second combination (45, 47) and the data transfer arrangement 35 described before.

The connection control unit 15 of each transmission module, such as the first module 11(1), comprises an additional bit discrimination arrangement 49 in addition to the data transmission arrangement 29 described in conjunction with FIG. 1. The connection control unit 15 of each reception module, such as the N-th module 11(N), comprises a destination module number discrimination and transform arrangement 51 and an additional bit addition arrangement 53 in lieu of the packet discrimination arrangement 31 described with reference to FIG. 1.

· In operation, it will be assumed that the second integer M is equal to a predetermined number and the third integer M', equal to another predetermined integer. Under the circumstances, the transmission modules have a common hardware structure. The reception modules also have a common hardware structure. When each module 11 comprises the transmission and the reception modules, the first through the N-th modules 11 have a common hardware structure. In such a module, the connection control unit 15 comprises the data transmission arrangement 29, the bit discrimination arrangement 49, the number discrimination and transform arrangement 51, and the bit addition arrangement 53. Each terminal connection port 17 (T) comprises the cell formation arrangement 41, the bit addition arrangement 43, the bit discrimination arrangement 45, and the cell reception arrangement 47. Each line connection port 17(L) is similarly implemented.

It will be presumed that a call originates in the m-th data terminal 21(m) of the local module 11(1) and is directed to an m'-th connection port 17(m') of the destination module, which is the N-th module 11(N) without loss of generality and where m' represents one of 1 through the second integer M. Receiving the transmission signal from the m-th data terminal 21(m), the cell formation arrangement 41 of the m-th connection port 17(m) forms a cell which is alternatively called a data cell and serves as the data packet together with at least one similar data cell. Each data cell is similar to an asynchronous transfer mode (ATM) cell and may or may not have a fixed length.

In FIG. 3, the cell comprises a data field DT and a header including a one-bit field AH, a first identifier field VPI, and a second identifier field VCI in the manner depicted along a first or top row labelled (1). The data field DT represents the information carried by the transmission signal. The second and the first identifier fields VCI and VPI are representative of the above-mentioned virtual channel identifier (VCI) and a virtual path identifier (VPI) which is standardized, like the virtual channel identifier, by the CCITT Recommendation I.361 and by the broad-band ISDN recommendation series.

Referring more particularly to FIGS. 2 and 3, it will first be surmised that the transmission signal should be switched to a destination port in a destination module which is different from the local module 11(1). In such an event, the cell is formed with a format depicted along a second row labelled (2) in FIG. 3.

More specifically, the bit addition and the cell formation arrangements 43 and 41 are for using the destination address of the transmission signal in placing a binary one bit "1" as an additional bit in the one-bit field of the cell, a module number (MLN) in the cell as the virtual path identifier, and a highway bus virtual channel number (HLCN) as the virtual path identifiers. The module number and the virtual channel number collectively serve as a control datum.

That is, the module number uniquely indicates the destination module. The module number indicates the ordinal number n which is assigned to the destination module as a destination module number. In cooperation with the module number, the virtual channel number individually specifies the destination port among the terminal and the line connection ports 17 of the first through the N-th modules 11.

It will next be surmised that the transmission signal is directed to one of the connection ports 17 that is specified by the transmission signal in the local module 11(1) as a destination port. In this event, the cell is formed with a different format illustrated along a third row labelled (3). In accordance with the different format, a binary zero bit "0" is placed as the additional bit in the one-bit field, a destination port number (PTN) as the virtual path identifier, and a module bus virtual channel number (MLCN) as the virtual channel identifier. The destination port number specifies the ordinal number m assigned to the last-mentioned destination port as a destination port number.

Supplied with such a cell through the module bus 19 of the local module 11(1), the bit discrimination arrangement 49 judges whether the logic one or zero bit is represented by the one-bit field. If the logic one bit is represented, the bit discrimination arrangement 49 preferably removes the one-bit field from the cell to produce a highway cell which is a cell depicted along a fourth or bottom row labelled (4) in FIG. 3.

Meanwhile, the bit discrimination arrangement 49 energizes the data transmission arrangement 29 so as to make the data transmission arrangement 29 transfer the highway cell to the highway bus 13. If the logic zero bit is judged, the bit discrimination arrangement 49 does not receive the cell and does not energize the data transmission arrangement 29 but leaves the cell transmitted through the module bus 19 of the local module 11(1). A cell is similarly formed and likewise dealt with in connection with the transmission signal received through the tandem line 23.

The highway cell reaches the connection control units 15 of the other modules 11(0). The number discrimination and transform arrangement 51 of the n-th module 11(n) is preliminarily loaded with a transform or conversion table based on the virtual channel identifier (VCI) which is preparatorily determined by negotiation between the connection control units 15 of the local and the n-th modules 11(l) and 11(n) with the connection ports 17 which are connected to the last-mentioned connection control units. It is to be noted on carrying out the negotiation that one of the connection ports 17 of the local module 11(1) should be supplied with a call control cell indicative of a predetermined number as the virtual channel identifier. In this manner, the transform table converts a combination of the module number (MLN) and the highway bus virtual channel number (HLCN) to another combination of the destination port number (PTN) and the module bus virtual channel number (MLCN).

With reference to the destination module number MLN of each highway cell, the number discrimination and transform arrangement 51 of the destination module discriminates between the module numbers MLN of the virtual path identifier fields in the highway cells and select only those of the highway cells which are directed to the destination module as the arriving cells. The connection control unit 15 need not discard other cells of the highway cells as spurious cells but leaves the other cells transmitted through the highway bus 13.

With reference to the transform table, the number discrimination transform arrangement 51 transforms the module number MLN and the highway bus virtual channel number HLCN of each arriving cell into a destination port number transform PTN' and a module bus virtual channel number transform MLCN' which are collectively indicative of the destination port in the destination module. The bit addition arrangement 53 adds the binary zero bit to the number transforms PTN' and MLCN'.

The connection control unit 15 of the destination module transfers a module bus cell to the module bus 19. In the manner depicted along the third row (3) in FIG. 3, the module bus cell is a cell wherein the one-bit field AH represents the binary zero bit and the first and the second identifier fields VPI and VCI, the destination port number TPN and the module bus virtual channel number MLCN which are represented by the respective number transforms PTN' and MLCN'.

In the m-th port 17(m) of the destination module, the bit discrimination arrangement 45 confirms the binary zero bit as the additional bit. When the cell reception arrangement 47 finds the destination port number PTN representative of its port number m in one of the module bus cells transmitted through the module bus 19, the cell reception arrangement 47 receives the last-mentioned one of the module bus cells as a selected cell for supply to the m-th data terminal 21(m). The cell reception arrangement 47 leaves other module bus cells transmitted through the module bus 14 of the local module 11(1).

When the destination port is one of the line connection port 17(L), the bit discrimination and the cell receiving arrangements 45 and 47 are operable to select the selected cell in the manner described above. The data transfer arrangement 25 transfers the selected cell to the tandem line 23 connected to this one of the line connection ports 17(L).

Reviewing FIGS. 2 and 3, it is now understood that the destination module 11(N) readily picks up from the transmission data of the highway bus 13 only the cell which is directed to the destination module 11(N) and does not receive other transmission data which are transmitted through the highway bus 13. This enables a high-speed operation of the asynchronous time division exchange system. Furthermore, the transform table is simple in its structure. This makes it possible to render each connection control unit 15 compact.

It is furthermore understood that this invention can be directed to one of the first through the M-th modules 11 that is used as the destination module. In this event, attention will be directed to one of the modules 11, such as the N-th module 11(N). Another of the modules 11, such as the first module 11(1), will be taken into consideration and will be called a particular module that serves as an originating module of the transmission signal. It should be noted that the transmission signal may be directed to one of the connection ports 17 of the particular or the originating module so that the particular module may be understood as a destination module. Consequently, the particular module is one of the modules 11 including the first-mentioned one of the modules.

Under the circumstances, each of the connection ports 17 of the originating module transfers the transmission signal to the module bus of the particular or the originating module as a cell with its header made to indicate a destination module number and a destination port number as a virtual path identifier when the destination module is different from and identical with the particular or the originating module, respectively.

In the first-mentioned one of the modules 11, namely, in the destination module, the connection control unit 15 picks up the cell from the transmission data as a module bus cell in response to the destination module number. The connection control unit in question transfers the module bus cell to the module bus 19 of the destination module.

In the destination module, one of the connection ports 17 is identified by a combination of the destination module number and the highway bus virtual channel number. Identified in this manner, this one of the connection ports 17 recovers from the module bus cell the information which is carried by the transmission signal.

While this invention has thus far been described in specific conjunction with only one preferred embodiment thereof, it will now be readily possible for one skilled in the art to carry this invention into effect in various other manners. For example, the header need not indicate the additional bit. This is because the cell includes the virtual path identifier (VPI) indicative of either the destination module number (MLN) or the destination port number when supplied to the module bus 19 of the originating module from one of its connection ports 17. The connection control unit 15 of the originating module can therefore discriminate by the virtual path identifier between the cells which should be and need not be transferred to the highway bus 13. Furthermore, each of the connection ports 17 can discriminate between such cells by the virtual path identifier. This discrimination is convenient when the second integer M is small. In addition, an asynchronous time division exchange or switching system may comprise a ring coupling or a star coupling for system elements. It should therefore be understood that the ring or the star coupling is an equivalent to the highway bus 13 and to each module bus 19. The bus 13 or 19 may be accessed either by central arbitration or token passing.

What is claimed is:

1. An asynchronous time division exchange system for transferring transmission data comprising a highway bus; a local module and one or more remote modules coupled to each other by said highway bus, each of said modules comprising a connection control unit connected to said highway bus, a plurality of connection ports, and a module bus connecting said connection ports to said connection control unit, each of said connecting ports being responsive to a transmission signal, and including means for adding to said transmission signal a first header indicating a destination module number as a virtual path identifier when said transmission signal is directed to one of said remote modules and indicating a destination port number as the virtual path identifier when said transmission signal is directed to one of the connection ports of said local module, and for transferring said transmission signal and header as a data cell to said module bus.

2. A system as claimed in claim 1, wherein said connection ports further comprises means for adding a second header indicating a highway bus virtual channel number as a virtual channel identifier when said transmission signal is directed to one of the remote modules and a module bus virtual channel number as the virtual channel identifier when said transmission signal is directed to one of the connection ports of said local module.

3. A system as claimed in claim 1, wherein said connection ports further comprises means for adding a third header indicating whether said transmission signal is directed to one of the remote modules or to one of the connection ports of said local module.

4. A system as claimed in claim 3, wherein said third header is a binary one and a binary zero bit when said transmission signal is directed to one of the remote modules and to one of the connection ports of said local module, respectively.

5. A system as claimed in claim 3, wherein the connection control unit of said local module discriminates based on said third header whether said transmission signal is directed to one of the remote modules or to one of the connection ports of said local module.

6. A system as claimed in claim 5, wherein the connection control unit of said local module transfers said data cell to said highway bus when said third header indicates that said transmission signal is directed to one of the remote modules.

7. A system as claimed in claim 6, wherein the connection control unit of said local module transfers said data cell to said highway bus with said additional bit removed therefrom.

8. A system as claimed in claim 6, wherein said connection control unit does not transfer said data cell to said highway bus when said third header indicates that said transmission signal is directed to one of the connection ports of said local module.

9. A system as claimed in claim 1, wherein the connection control unit of said local module discriminates based on said virtual path identifier whether said transmission signal is directed to one of the remote modules or to one of the connection ports of said local module.

10. A system as claimed in claim 9, wherein the connection control unit of said local module transfers said data cell to said highway bus when said virtual path identifier indicates that said transmission signal is directed to one of the remote modules.

11. A system as claimed in claim 9, wherein the connection control unit of said local module does not transfer said data cell to said highway bus when said virtual path identifier indicates that said transmission signal is directed to one of the connection ports of said local module.

12. An asynchronous time division exchange system for transferring transmission data among a plurality of modules connected to each other through a highway bus, each of said modules comprising a connection control unit connected to said highway bus, a plurality of connection ports, and a module bus connecting said connection ports to said connection control unit, each of said connection ports being responsive to a transmission signal, one of the modules being a destination module to which said transmission signal is directed, and one of said modules including said destination module being an originating module, wherein a connection port of said originating module transfers said transmission signal together with a first header to the module bus of said originating module as a data cell, said first header indicating a destination module number as a virtual path identifier when said destination module is different from said originating module and a destination port number as the virtual path identifier when said destination module is identical with said originating module.

13. A system as claimed in claim 12, wherein the connection port of said originating module adds a second header to said transmission signal indicating a highway bus virtual channel number as a virtual channel identifier when said destination module is different from said originating module and a module bus virtual channel number as the virtual channel identifier when said destination module is identical with said originating module.

14. A system as claimed in claim 13, wherein the connection control unit of said originating module transfers said data cell to said highway bus when said destination module is different form said originating module.

15. A system as claimed in claim 14, wherein the connection control unit of said destination module receives said data cell form said transmission signal as a module bus in response to said destination module number.

16. A system as claimed in claim 15, wherein the connection control unit transfers said module bus cell to the module bus of said destination module.

17. A system as claimed in claim 16, wherein one of the connection ports of said destination module recovers information carried by said transmission signal in response to said destination module number and said highway bus virtual channel number form the module bus cell transmitted through the module bus of said destination module.

18. An asynchronous time division exchange system comprising a plurality of modules and a highway bus connecting said modules, said exchange system transferring transmission data among said modules, each module comprising a connection control unit connected to said highway bus, a plurality of connection ports, and a module bus connecting said connection ports to said connection control unit, each connection port being responsive to a transmission signal, wherein each of said connection ports in a first one of said modules is for transferring said transmission signal to the module bus of said one of the modules as a cell with header data indicating a destination module number as a virtual path identifier when said transmission signal is directed to a different one of said modules and a destination port number as the virtual path identifier when said transmission signal is directed to one of the connection ports of said first module.

19. An asynchronous time division exchange system as claimed in claim 18, wherein said each of the connection ports of the first module adds a second header to said transmission signal indicating a highway bus virtual channel number as a virtual channel identifier when said transmission signal is directed to one of the modules and a module bus virtual channel number when said transmission signal is directed to one of the connection ports of said module.

20. An asynchronous time division exchange system as claimed in claim 18, wherein said each of the connection ports adds a third header to said transmission signal indicating whether said transmission signal is directed to one of the modules or to one of the connection ports of said first module.

21. An asynchronous time division exchange system as claimed in claim 20, wherein the connection control unit of said first module transfers said cell to said highway bus when said third header indicates that said transmission signal is directed to said different one of the modules.

22. An asynchronous time division exchange system as claimed in claim 20, wherein the connection control unit of said first module does not transfer said cell to said highway bus when said third header indicates that said transmission signal is directed to one of the connection ports of said first module.

* * * * *

UNITED STATES PATENT AND TRADEMARK OFFICE
CERTIFICATE OF CORRECTION

PATENT NO. : 5,287,355
DATED : February 15, 1994
INVENTOR(S) : Kiyoh Takahashi et al It is certified that error appears in the above-indentified patent and that said Letters Patent is hereby corrected as shown below:

Abstract, lines 9 and 10, delete "and does not transfer";

Abstract, line 11, after "and" insert --does not transfer the cell to--.

Col. 7, line 60, delete "1" and insert --1--.

Signed and Sealed this

Twenty-fifth Day of October, 1994

Attest:

BRUCE LEHMAN

Attesting Officer     Commissioner of Patents and Trademarks